US007012878B2

(12) United States Patent
Shinotsuka et al.

(10) Patent No.: US 7,012,878 B2
(45) Date of Patent: Mar. 14, 2006

(54) OPTICAL RECORDING MEDIUM AND OPTICAL RECORDING PROCESS USING THE SAME

(75) Inventors: Michiaki Shinotsuka, Kanagawa (JP); Takuro Sekiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 403 days.

(21) Appl. No.: 10/394,547

(22) Filed: Mar. 21, 2003

(65) Prior Publication Data

US 2004/0001418 A1 Jan. 1, 2004

(30) Foreign Application Priority Data

Mar. 22, 2002 (JP) ....................................... 2002-080057
Mar. 29, 2002 (JP) ....................................... 2002-096709
Sep. 19, 2002 (JP) ....................................... 2002-273670

(51) Int. Cl.
*G11B 7/00* (2006.01)

(52) U.S. Cl. ...................................... 369/275.4; 369/94

(58) Field of Classification Search .............. 369/275.1, 369/275.2, 275.3, 275.4, 94
See application file for complete search history.

(56) References Cited

U.S. PATENT DOCUMENTS 5,736,657 A 4/1998 Ide et al.
6,018,510 A 1/2000 Abe et al.
6,096,398 A 8/2000 Yuzurihara et al.
6,190,750 B1 2/2001 Wierenga et al.
6,193,348 B1 2/2001 Sekiya et al.
6,221,557 B1 4/2001 Harigaya et al.
6,227,639 B1 5/2001 Sekiya et al.
6,312,779 B1 11/2001 Hirotsune et al.
6,319,368 B1 11/2001 Ide et al.
6,338,545 B1 1/2002 Sekiya
6,426,936 B1 7/2002 Shinotsuka et al.
6,456,584 B1 * 9/2002 Nagata et al. ........... 369/275.2
6,554,401 B1 4/2003 Sekiya
6,568,778 B1 5/2003 Sekiya et al.
6,598,959 B1 7/2003 Sekiya
6,652,806 B1 11/2003 Ide et al.
6,652,948 B1 11/2003 Shinotsuka
2001/0023006 A1 9/2001 Miyamoto et al.

OTHER PUBLICATIONS

U.S. Appl. No. 08/547,904 to Sekiya, filed Oct. 25, 1995.
U.S. Appl. No. 09/793,249 of Sekiya, filed Feb. 26, 2001.
U.S. Appl. No. 09/988,845, of Sekiya, filed Nov. 16, 2001.
U.S. Appl. No. 10/085,204, filed Feb. 26, 2002.
U.S. Appl. No. 10/119,193, filed Apr. 10, 2002.
U.S. Appl. No. 10/175,181 of Sekiya, filed Jun. 19, 2002.
U.S. Appl. No. 10/186,613, filed Jul. 2, 2002.
U.S. Appl. No. 10/192,246, of Shinotsuka et al., filed Jul. 9, 2002.
U.S. Appl. No. 10/224,656 of Sekiya, filed Aug. 20, 2002.

* cited by examiner

*Primary Examiner*—Nabil Hindi
(74) *Attorney, Agent, or Firm*—Cooper & Dunham LLP

(57) ABSTRACT

An optical recording medium having two recording layer structures which includes a cover substrate, a grooved substrate, a first recording layer structure, an intermediate layer, a separation layer, and a second recording layer structure. In the optical recording medium, the two recording layer structures include a first recording layer structure, and a second recording layer structure between the substrates, the first recording layer structure includes, in this order, a first protective layer, a first recording layer, a second protective layer, a first inorganic layer, the second recording layer structure includes, in this order, a third protective layer, a second recording layer, a forth protective layer, a second inorganic layer, and a ratio of a thickness of the first recording layer structure and a thickness of the intermediate layer is 0.2 to 1.0.

20 Claims, 4 Drawing Sheets

Prior Art

OPTICAL RECORDING MEDIUM AND OPTICAL RECORDING PROCESS USING THE SAME

BACKGROUND OF THE INVENTION

1. Field of the Invention

The present invention relates to optical recording medium in which information is recordable, reproduceable and rewritable at a high density and a high speed, using a laser beam irradiator.

2. Description of the Related Art

In an optical recording medium, a laser beam is irradiated locally to a recording material and then a difference in optical property generated thereby is used as a recording state. Use of a material having reversible change in this optical property enables rewriting the information which has been recorded. Generally, as a rewritable optical recording medium, a magneto-optical recording medium and a phase change optical recording medium are well known. These optical recording media enable recording mass of information as well as rewriting and reproducing the information at high speed simultaneously. These optical media are also excellent in portability. Accordingly, a demand has been increasing to produce these optical media for more capacity at a higher speed.

A phase change optical recording medium takes advantage of a difference of reflected light to a light having a specific wavelength between the crystalline and the amorphous as a recording state. Modulating output power of the laser enables erasing and rewriting the recorded information simultaneously. The modulation accordingly allows the phase change optical recording medium to be rewritten the information signal at a high speed and with ease.

FIG. 4 shows an example of a conventional structure of layers of a phase change optical recording medium. As shown in FIG. 4, a conventional phase change type optical recording medium is constituted by a substrate 1, and a protective layer 2, a recording layer 4, a protective layer 8 and a reflective layer 6, all of which are sequentially formed on the substrate 1. The substrate 1 is made of resins such as polycarbonates (PC) and polymethylmethacrylates (PMMA), or glasses. The substrate 1 guide grooves for guiding a laser beam are formed thereon. The recording layer 4 has some states having different optical properties, and comprises a substance that can reversibly change the states. In case of a rewritable phase change type optical recording medium, materials for the recording layer 4 include chalcogenide whose main components are Te or Sb such as materials having main components of Te—Sb—Ge, Te—Sn—Ge, Te—Sb—Ge—Se, Te—Sn—Ge—Au, Ag—In—Sb—Te, In—Sb—Se, In—Te—Se, or the like.

The reflective layer 6 comprises metals such as Au, Al, and Cr, or alloys thereof. The reflective layer 6 is prepared for purposes of dissipating heat effectively and of effective light absorption in the recording layer 4. Although not shown in the FIG. 4, an over coating layer is provided on the reflective layer 6 in order to prevent oxidization, corrosion, adhesion of dust or the like. Alternatively, a dummy substrate may be provided on the reflective layer 6, using the ultraviolet radiation curing resins as an adhesive.

The protective layers 2 and 8 play a role of preventing oxidation, evaporation, and deformation of the materials for the recording layer 4. Controlling the thickness of the protective layers 2 and 8 enables adjusting light absorption of a recording medium and a difference of reflection ration between a recording portion and an erasing portion. Accordingly, the protective layers 2 and 8 play roles of controlling optical properties of the recording medium. The materials for the protective layers 2 and 8 are required to exhibit excellent adhesion properties to the recording layer 4 and the substrate 1, in addition to meeting the requirements above. The protective layers 2 and 8 are required to be a film having excellent weathering resistance that does not cause cracklings. When contacted with the recording layer 4, the protective layers 2 and 8 are required to be composed of materials that do not affect optical change in the recording layer 4.

Examples of the materials for the protective layers 2 and 8 include sulfides such as ZnS, or the like; oxides such as $SiO_2$, $Ta_2O_5$, $Al_2O_3$, or the like; nitrides such as Ge—N, $Si_3N_4$, $Al_3N_4$ or the like; nitrogen oxides such as Ge—O—N, Si—O—N, Al—O—N, or the like. The examples further include dielectrics such as carbides and fluorides, or the like. These may be used in suitable combination of two or more. Of these, ZnS—$SiO_2$ is widely used.

Conventionally, overwriting distortion occurs. The overwriting distortion is caused by a state in which a rewritten mark slightly shears. The overwriting distortion occurs because the temperature rises differently depending on a state of recording layer 4 between in an amorphous state and in a crystalline state. A portion before rewriting requires latent heat to phase-change the portion from a crystalline state to an amorphous state, when the portion before rewriting is in a crystalline state. On the other hand, when the portion before rewriting is in an amorphous state, the latent heat is not required. Therefore, excess heat amorphousizes the recording layer 4 more than predetermined.

When "Aa" expresses a light absorption of the recording layer 4 in an amorphous state, and "Ac" expresses a light absorption of the recording layer 4 in a crystalline state, "Ac/Aa" may be maintained in 1 or more in order to avoid the overwriting distortion, which enables adjusting light absorption. Accordingly rise in temperature at an amorphous portion of the recording layer can be assisted. The temperature at the marked portion after rewriting rises uniformly. Mark distortion is hence less likely to occur.

Some methods have been proposed to realize a relation of: Ac/Aa>1. For example, "Ra," which is a reflection rate of an amorphous state, is determined to be higher than "Rc," which is a reflection rate of a crystalline state, so as to satisfy the relation of: "Rc<Ra." In this case, even if a difference, "Ra−Rc," of reflection ratios between an amorphous state and a crystalline state is large, a value of Ac/Aa may still be large. Specifically, in FIG. 4, another layer is formed between the substrate 1 and the protective layer 2, and the layer has a certain optical constant, hence the relation of "Rc<Ra" can be satisfied.

Even if "Rc" and "Ra" meet the relation of "Rc>Ra," the relation, "Ac/Aa>1," may still be attained. In this case, the optical recording medium employs either light-transmittance structure, or light-absorbing structure. The light-transmittance structure creates transmittance in the optical recording medium. When "Tc" expresses transmittance of amorphous recording layer, and "Ta" expresses transmittance of crystalline recording layer, "Tc" and "Ta" each satisfy the relation of 0<Tc<Ta. On the other hand, in the light-absorbing structure, a layer that absorbs a light is provided in the optical recording medium. The light absorption in the layer that absorbs a light satisfies a relation of 0<Ac2<Aa2, when the Aa2 expresses an absorption at the layer that absorbs a light in an amorphous state, and Ac2 expresses an absorption in a crystalline state. Specifically, in a case of the light-transmittance structure, the reflective layer 6 may be thinned so as to attain light-transmittance, as shown in FIG. 4. In a case of the light-absorbing structure, for instance in FIG. 4, a layer that absorbs a light may be provided between the reflective layer 6 and the protective layer 8.

An optical recording medium having such a relation of reflection rate as Rc<Ra is advantageous since the optical recording medium is more likely to have a structure that satisfies a relation of: Ac/Aa>1. The optical recording medium, on the other hand, is disadvantageous in causing noise at reproducing a signal, as the sum of reflection rate at the amorphous portion and the crystalline portion are considerably larger than that of an optical recording medium having such a relation of reflection rate as Rc>Ra. The optical medium having such a relation of reflection rate as Rc>Ra is less likely to have a disadvantages like noise, but it is still disadvantageous in having a large value for Ac/Aa. Accordingly, it is preferable to choose the structures depending on the necessity.

Some improvement has been proposed conventionally for the structure of a light-transmittance optical recording medium that satisfies the relations of both "Rc>Ra" and "0<Tc<Ta." For example, Japanese Patent Application Laid-Open (JP-A) No. 08-50739 discloses a technique in which a recording layer and a reflective layer having a light-transmittance properties are provided. In this technique, the reflective layer is provided in contact with a thermal dissipating layer that helps thermal diffusion of the reflective layer in an optical recording medium that employs light-transmission. The JP-A No. 08-50739 does not state any technique to give optical effects to the thermal dissipating layer, and describes that the thickness of the thermal dissipating layer may be suitably selected as long as it does not prevent the optical structure or design.

JP-A No. 09-91755 discloses a technique in which a dielectric layer is provided on a reflective layer in an optical recording medium having light-transmittance. However, in this case, the dielectric layer is formed in order to reduce phase difference. The JP-A No. 09-91755 does not states the thermal effects derived from the dielectric layer, neither states the optical effects derived from controlling the thickness of the dielectric layer.

The JP-A No. 03-157830 discloses an optical recording medium having two recording layer structures, which has been known as the modified optical recording medium having a light-transmittance structure. In order to attain a larger capacity of the optical recording medium, a transparent separation layer is provided between the two recording layer structures. A laser is irradiated from only one direction, and the laser transmits both of the two recording layer structures. With this technique, a density of recording may become more intense, hence a capacity of the optical recording medium becomes larger as a whole.

An optical recording medium having a light-transmittance structure is advantageous from a viewpoint of having less excess heat therein. An optical recording medium having a light-transmittance structure is hence desirable from a viewpoint of repeating properties and adjacent erasing properties (properties to erase an adjacent tracks; tracks that has been recorded are diffused to an adjacent track, and the signals recorded adjacent to the tracks are erased). Having a thin reflective layer, the recording layer may not be rapidly cooled down after heated. Therefore, a mark may be formed with difficulty. Especially, in a structure satisfying a relationship of Rc>Ra, it was fundamentally difficult to set a value of Ac/Aa very large. The optical recording medium having two recording layer structures has conventionally required the recording layer to be thin in order to attain a sufficient light-transmittance, when the optical recording medium having two recording layer structures is placed in a direction of laser-irradiation.

However, crystallization becomes difficult in the thin recording layer. High light transmittance was unable to compatible with high erasing rate or high erasing properties. There are very few techniques to improve repetitive recording properties of a light-transmittance optical recording medium. A demand has been made on improving the repetitive recording properties.

SUMMARY OF THE INVENTION

The present invention is aimed to solve the above-mentioned problems in conventional art.

An object of the present invention is therefore to provide a light-transmittance optical recording medium having two recording layer structures, which improves both cooling properties and repetitive recording properties, and enables twice more recording capacity than a conventional optical recording medium.

Another object of the present invention is to improve repetitive recording properties of the light-transmittance optical recording medium having two recording layer structures.

Another object of the present invention is to provide almost equal recording properties for each of the two recording layer structures of the light-transmittance optical recording medium having two recording layer structures.

Still another object of the present invention is to provide almost equal erasing properties for each of the two layer structures of the light-transmittance optical recording medium having two recording layer structures.

Still further object of the present invention is to improve cooling properties of the light-transmittance optical recording medium having two recording layer structures.

According to present invention, the above-mentioned objects are attained by following techniques:

The present invention provides, in a first aspect, an optical recording medium which comprises a cover substrate, a grooved substrate, a first recording layer structure, an intermediate layer, a separation layer, and a second recording layer structure. In the optical recording medium, the cover substrate, the first recording layer structure, the intermediate layer, the separation layer, the second recording layer structure and the grooved substrate are disposed in this order, a laser beam is irradiated from a direction of the cover substrate, the two recording layer structures include a first recording layer structure, and a second recording layer structure between the cover substrate and the grooved substrate, the first recording layer structure includes, in this order, a first protective layer, a first recording layer having Sb and Te as main components thereof, a second protective layer, a first inorganic layer having metal as components thereof, the second recording layer structure includes, in this order, a third protective layer, a second recording layer having Sb and Te as main components thereof, a forth protective layer, a second inorganic layer having metal as a component thereof, and a ratio (t/T1) of a thickness (T1) of the first recording layer structure and a thickness (t) of the intermediate layer is 0.2 to 1.0.

According to a second aspect of the present invention, the optical recording medium may have an interface layer on at least one of surfaces of at least one of the first recording layer and the second recording layer.

According to a third aspect of the present invention, the grooved substrate may have a width of 0.10 $\mu$m to 0.46 $\mu$m and a depth of 0.01 $\mu$m to 0.04 $\mu$m, and is formed with a pitch of 0.28 $\mu$m to 0.50 $\mu$m, recording and reproducing are carried out by irradiating a laser beam having wavelength of 360 nm to 420 nm and a spot diameter of 0.30 $\mu$m to 0.52 $\mu$m ($1/e^2$) from a direction of the cover substrate, and a recording power of the laser beam is 3 mW to 12 mW.

According to a fourth aspect of the present invention, the recording power of the laser beam is larger in the second recording layer structure than in the first recording layer structure.

According to a fifth aspect of the present invention, an erasing power of the laser beam is larger in the second recording layer than in the first recording layer.

According to a sixth aspect of the present invention, a thermal capacity of the second recording layer structure is less than a total thermal capacity of the cover substrate and the grooved substrate.

According to a seventh aspect of the present invention, a total thermal capacity of the first recording layer structure and the second recording layer structure is less than a thermal capacity of the grooved substrate.

According to an eighth aspect of the present invention, a thickness of each of the cover substrate and the grooved substrate is 0.2 mm to 1.5 mm.

According to a ninth aspect of the present invention, the main components of each of the first recording layer and the second recording layer are selected at least from Ge—Sb—Te, Sb—Te, Sb—Te—Zn, Sb—Te—Ag, Te—Bi—Ge, Sb—Te—Ge—Se, Te—Sn—Ge—Au, Sb—Te—Ag—In, Se—In—Sb, and Te—Se—In.

According to a tenth aspect of the present invention, each of the first recording layer and the second recording layer contains 50 at % to 80 at % of the Sb, and 10 at % to 30 at % of the Te.

According to an eleventh aspect of the present invention, a thickness of the first recording layer is 3 nm to 40 nm.

According to a twelfth aspect of the present invention, a thickness of the second recording layer is 3 nm to 40 nm.

According to a thirteenth aspect of the present invention, a thickness of the first inorganic layer is 1 nm to 80 nm.

According to a fourteenth aspect of the present invention, a thickness of the second inorganic layer is 1 nm to 80 nm.

According to a fifteenth aspect of the present invention, the main components are one of the same and different between the first recording layer structure and the second layer structure, and the main components are selected at least from Al, Au, Ag, and Cu.

According to a sixteenth aspect of the present invention, the first inorganic layer comprises Ag as a main component thereof.

According to a seventeenth aspect of the present invention, each of the first protective layer, the second protective layer, the third protective layer, and the fourth protective layer comprises $ZnS—SiO_2$ as a main component thereof.

The present invention provides, in an eighteenth aspect, an optical recording process which includes the step of irradiating a laser beam from a direction of a cover substrate to one of two recording layer structures disposed on a grooved substrate of an optical recording medium according to the present invention, so as to record in one of the two recording layer structures. In the optical recording process, the laser beam has a recording power of 3 mW to 12 mW, wavelength of 360 nm to 420 nm and a spot diameter of 0.30 $\mu$m to 0.52 $\mu$m ($1/e^2$), the grooved substrate has a width of 0.10 $\mu$m to 0.46 $\mu$m and a depth of 0.01 $\mu$m to 0.04 $\mu$m, and is formed with a pitch of 0.28 $\mu$m to 0.50 $\mu$m, the two recording layer structures include a first recording layer structure and a second recording layer structure.

According to a nineteenth aspect of the present invention, in the optical recording process, the recording power of the laser beam is larger in the second recording layer structure than in the first recording layer structure.

According to a twentieth aspect of the present invention, in the optical recording process, an erasing power of the laser beam is larger in the second recording layer than in the first recording layer.

DESCRIPTION OF THE PREFERRED EMBODIMENTS

An optical recording medium having two recording layer structures according to the present invention will be described in detail hereinafter.

Figure 1:
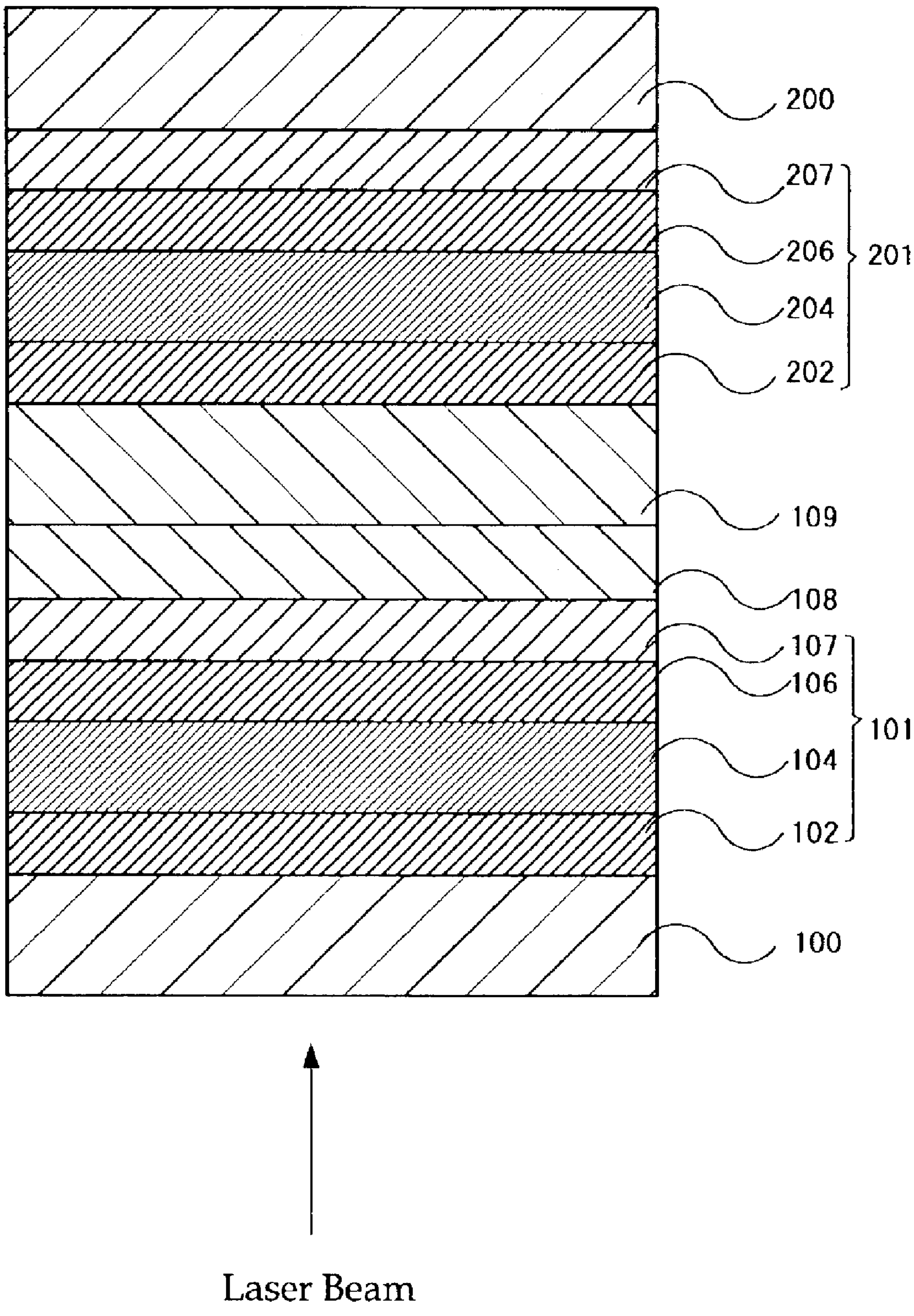
FIG. 1 is a sectional view showing an example of a light-transmittance optical recording medium having two recording layer structures according to the present invention.
Figure 2:
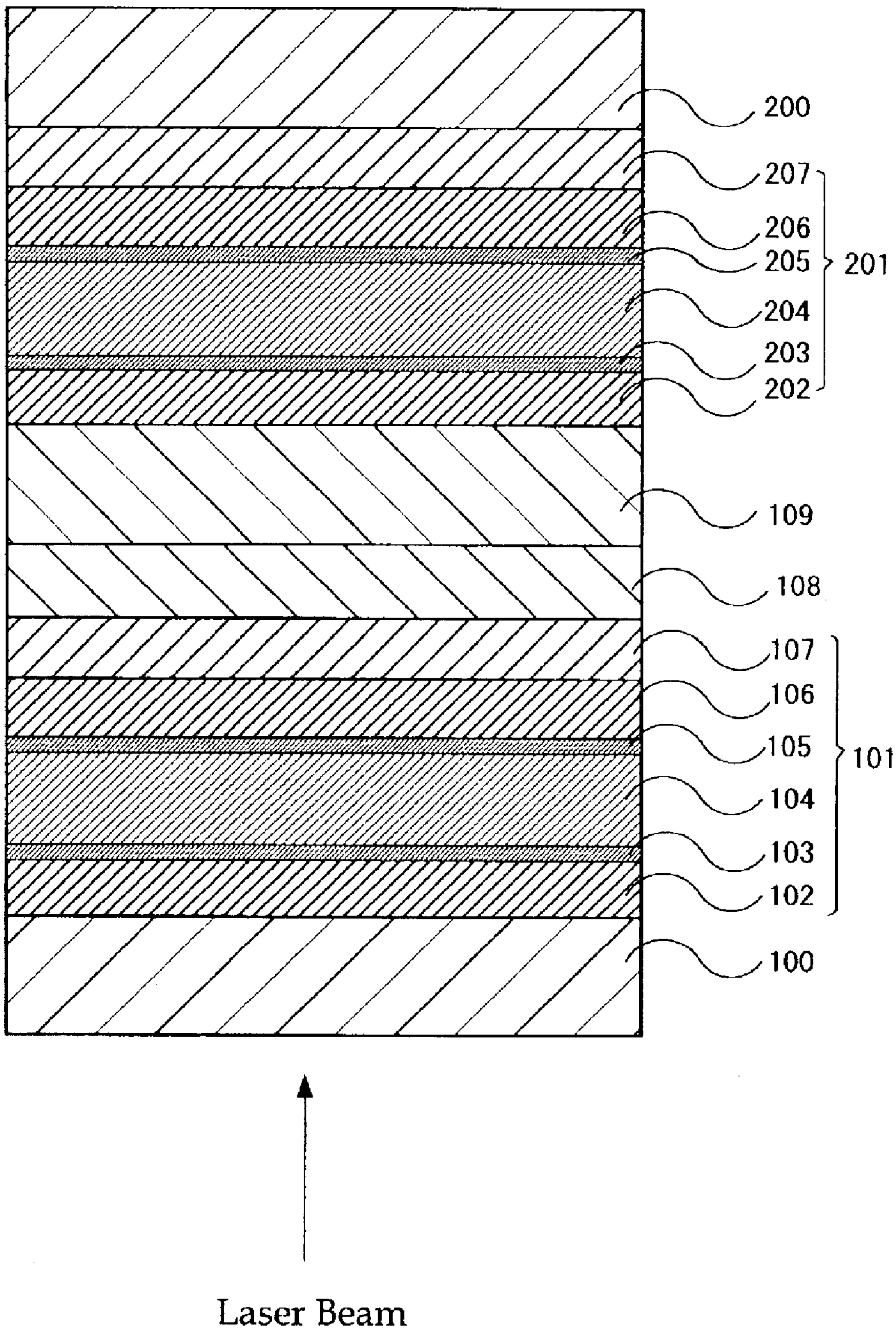
FIG. 2 is a sectional view showing another example of a light-transmittance optical recording medium having two recording layer structures according to the present invention.

FIGS. 1 and 2 are each a schematic sectional view showing an example of a structure of an optical recording medium having two recording layer structures according to the present invention. FIG. 1 shows a structure in which a first recording layer structure 101 and a second recording layer structure 201 are formed between a cover substrate 100 and a grooved substrate 200. Here, although not shown in the FIGS. 1 and 2, the thicknesses of each of the cover substrate 100 and the grooved substrate 200 are larger than a total thickness of the first recording layer structure 101 and the second recording layer structure 201. A intermediate layer 108 and a separation layer 109 are each disposed between the first recording layer structure 101 and the second recording layer structure 201.

The first recording layer structure 101 includes a first protective layer 102, a first recording layer 104, a second protective layer 106, and a first reflective layer (a first inorganic layer having metals as a constituent material) 107, each of which is sequentially formed in this order on a surface of the cover substrate 100.

The second recording layer structure 201 includes a third protective layer 202, a second recording layer 204, a fourth protective layer 206, and a second reflective layer (a second inorganic layer having metals as a main component) 207, each of which is sequentially formed in this order on a surface of the separation layer 109. An example of a structure shown in FIG. 2 shows that first and second interface layers 103 and 105 are each formed on both of the surfaces of the first recording layer 104 for the first layer structure 101. FIG. 2 also shows that the third and fourth interface layers 203 and 205 are each formed on both of the surfaces of the second recording layer 204 for the second layer structure 200.

The cover substrate 100 is formed toward a direction where a laser beam is irradiated. The materials of the cover substrate 100 may be transparent materials such as resins, glasses, or the like. Specific examples of the resins include polycarbonate (PC), polymethylmethacrylate (PMMA), and the like. A thickness of the cover substrate 100 is preferably 0.2 mm to 1.5 mm, according to the following reasons.

A grooved substrate 200 has grooves of 0.10 μm to 0.45 μm wide and 0.01 μm to 0.04 μm. The grooved substrate 200 is formed with a pitch of 0.28 μm to 0.50 μm. Although not shown in the figures, the grooves are formed on a surface that contacts the second recording layer structure 201. If the grooves are ranged above, the grooved substrate 200 has more reflection rate than that of a plane of the grooved substrate 200. Additionally, the grooved substrate 200 exhibits excellent repetitive reproducing properties with the grooves. Materials of the grooved substrate 200 may be transparent materials such as resins, glasses, or the like. Specific examples of the resins include polycarbonate (PC), polymethylmethacrylate (PMMA), and the like. A thickness of the grooved substrate 200 is suitably 0.2 mm to 1.5 mm.

The laser beam, which has wavelength of 360 nm to 420 nm, a spotting diameter of 0.30 μm to 0.52 μm ($1/e^2$, which refers to a beam spot diameter at a laser beam light strength of $1/e^2$; a beam diameter when a light strength of 0.137 (herein the maximum light strength is 1), and e=2.7), is irradiated from a direction of a cover substrate 100. The power of recording is 3 mW to 12 mW. If the power of recording is less than 3 mW, insufficient mark is formed. If the power of recording is more than 12 mW, the optical recording medium itself becomes fractured. These are revealed from experimental data.

Each of the first protective layer 102 and the second protective layer 106, and the third protective layer 202 and the fourth protective layer 206 (may be referred to as merely "protective layer") is formed for the purpose of controlling optical properties such as effective light absorption in the first recording layer 104 and the second recording layer 204 (may be referred to as merely "recording layer"). Examples of the materials for the protective layers 102, 106, 202, and 206 include sulfides such as ZnS, or the like; oxides such as $SiO_2$, $Ta_2O_6$, $Al_2O_3$, or the like; nitrides such as Ge—N, $Si_3N_4$, $Al_3N_4$, or the like; nitrogen oxides such as Ge—O—N, Si—O—N, Al—O—N, or the like; dielectrics such as carbides, fluorides, or the like. These can be used in combination such as ZnS—$SiO_2$ or the like. ZnS—$SiO_2$ shows the most preferable properties in a case of the structures shown in FIGS. 1 and 2.

As shown in FIG. 2, the first interface layer 103, the second interface layer 105, the third interface layer 203, and the fourth interface layer 205 (may be referred to as merely "interface layer") are each formed. The interface layers play a role of not only preventing the recording layers 104 and 204 from oxidizing, corroding, and deforming, but also of preventing diffusion of atoms or other components such as sulfur and sulfides, both of which may be contained in the protective layers 102, 106, 202, and 206, to the recording layers 104 and 204.

Preventing the diffusion of the atoms significantly improves the repeating properties of an optical recording medium. The interface layer may be formed either of the surfaces, or both of the surfaces of the recording layer. In order to more effectively prevent the diffusion of the atoms, the interface layer may be formed both of the surfaces of the recording layer.

Another important role of the interface layer is to accelerate the crystallization of the recording materials, without ruining the thermal stability at the recorded portion (amorphous portion), when the interface layer is formed in contact with a recording layer.

The interface layer is formed on both of the surfaces of the recording layer, so as to attain excellent recording properties and excellent repeating properties at a high speed, at the same time.

Materials for the interface layers 103, 105, 203, and 205 are not limited, as long as the materials attain the roles described above. Examples of the materials include those having nitrides, nitrogen oxides, oxides, carbides, fluorides as the main component. Sulfides or selenides may be mixed depending on the case. Specific examples of the nitrides include Ge—N, Cr—N, Si—N, Al—N, Nb—N, Mo—N, Ti—N, Zr—N, Ta—N, and the like. Specific examples of the nitrogen oxides include Ge—O—N, Cr—O—N, Si—O—N, Al—O—N, Nb—O—N, Mo—O—N, Ti—O—N, Zr—O—N, Ta—O—N, and the like. Specific examples of the oxides include $SiO_2$, $Al_2O_3$, $TiO_2$, $Ta_2O_5$, Zr—O, and the like. Specific examples of the carbides include Ge—C, Cr—C, Si—C, Al—C, Ti—C, Zr—C, Ta—C, and the like. Specific examples of the fluorides include Li—F, Ca—F, and the like. These may suitably used in combination. ZnS, ZnSe, or the like can be used when sulfide and selenide in a suitable amount are mixed. In any case, the interface layer is made of materials that do not cause diffusion easily to recording layers, or of materials that do not easily prevent optical change of the recording layer even if the atoms are diffused to the recording layer, and of materials that accelerate crystallization of the recording layer when formed in contact with the recording layer.

The present inventors have found out that Ge—N showed the best performance in a structure shown in FIG. 2. This is because, in the structure shown in FIG. 2, ZnS—$SiO_2$ shows the most excellent properties as a material for the interface layers. When used in the combination with ZnS—$SiO_2$, preventing the diffusion is considered the most important. Ge—N shows the best performance with this regard.

A thickness of the interface layers 103, 105, 203, and 205 is preferably 1 nm or more. The effective prevention of the diffusion may not be obtained, as experimental data show, if the thickness is less than 1 nm. The upper limit of the thickness is preferably 2 nm to 5 nm, from the viewpoint of recording sensitivity.

The materials for the recording layers 104, 204 may be those which reversibly change optical properties. Of these materials, chalcogenide materials having Te or Sb as main components can be preferably used in case of a phase change optical recording medium. Examples of the main components for the materials include Ge—Sb—Te, Sb—Te, Sb—Te—Zn, Sb—Te—Ag, Sb—Te—Ge—Se, Sb—Te—Ag—In. A content of Sb in a material for the recording layers is preferably 50 at % to 80 at %. A content of Te in a material for the recording layers is preferably 10 at % to 30 at %. As shown in the range above, having more Sb than Te positively contributes to faster recording linear. In the present invention, "at %" refers to "% by atom."

The recording layers 104 and 204 may contain impurities, for example, sputtering gas components such as Ar, Kr, or the like, and H, C, $H_2O$, or the like. The content of the impurities in the recording layer may be reduced to the extent that the content does not prevent recording and reproducing of a signal. The recording layers 104 204 may further contain various substances in a main component of the recording layers with a very small amount (about 10 at % or less). The content of the various substances may be reduced to the extent that the content does not prevent recording and reproducing of a signal.

The present inventors have found out that, in the structures shown in FIGS. 1 and 2, the recording layers shows the most excellent properties with Ge—Sb—Te, where the contents of Ge, Sb, and Te are each 2 at % to 10 at %, 60 at % to 89 at %, and 10 at % to 30 at %.

A thickness of the recording layers 104 and 204 is preferably 3 nm to 40 nm. If the thickness is less than 3 nm, the materials for the recording layers are less likely to create a uniform thickness, hence effective phase change is less likely to occur between an amorphous portion and a crystalline portion. If the thickness is more than 40 nm, heat is dissipated in the film of the recording layers. Therefore, a signal is likely to be subjected to adjacent erasing, when recorded at a high density.

A first reflective layer (may be referred to as merely a reflective layer) 107 is a light transmittance reflective layer, and has heat dissipation properties. Here, the term, "light transmittance reflective layer" refers to a layer that functions both as a reflective layer and a light transmittance layer. With the reflective layer, a half amount of the light transmits the reflective layer. A thermal conductivity at the reflective layer is also high. Therefore, the first recording on an optical recording medium having the reflective layer is required to be marked small. In order to attain the properties of the reflective layer, materials for the reflective layer 107 preferably contains at least one of Au, Ag, and Cu. The materials work advantageously so that the optical constant has a large value of Ac/Aa. With the high thermal conductivity, even a thin reflective layer can exhibit a considerable cooling properties. Examples of the material for the reflective layer 107 also include a mixture or an alloy of other materials and one of Au, Ag, and Cu. The materials mentioned above are used in order to prevent corrosion, and to attain more effective optical structure. Specific examples of the materials for the reflective layer 107 include Cr, Pt, Pd, Al, Mg, W, Ni, Mo, Si, Ge, and the like. These can be selected according to the necessity. The present inventors have found out that Ag, when contained in the reflective layer as a material, shows the most excellent properties, where a content of the Ag is 90 at % to 99 at %.

A thickness of the reflective layer 107 is preferably 1 nm to 80 nm. If the thickness is less than 1 nm, the reflective layer 107 cannot be formed uniformly, hence both heat dissipating properties and optical effects of the reflective layer deteriorate. If the thickness is more than 80 nm, less light transmits the optical recording medium itself, hence a relation of light absorption adjustment (Ac/Aa>1) may not be realized.

A second reflective layer (may also be merely referred to as reflective layer) 207 is excellent in heat dissipation property. Since the reflective layer 207 does not require as much light transmittance as the reflective layer 107. Therefore, the reflective layer 207 may be thick. Materials for the reflective layer 207 may be metals. The materials preferably contain at least one of Al, Au, Ag, and Cu. Containing at least one of Al, Au, Ag, and Cu is preferable and advantageous because the optical constant is far more than a value of Ac/Aa. Due to the high thermal conductivity, even a thin reflective layer 207 exhibit a considerable cooling properties.

Examples of the material for the reflective layer 207 also include a mixture or an alloy of other materials and one of Al, Au, Ag, and Cu. The materials mentioned above are used in order to prevent corrosion, and to attain more effective optical structure. Specific examples of the materials for the reflective layer 207 include Cr, Pt, Pd, Mg, W, Ni, Mo, Si, Ge, and the like. These can be selected according to the necessity.

The present inventors have found out that an Al alloy, when contained in the reflective layer as a material, shows the most excellent properties, where a content of the Al alloy is 90 at % to 99 at %.

A thickness of the reflective layer 207 is preferably is 1 nm to 80 nm or less. A thickness of the reflective layer 207 is preferably 1 nm to 80 nm. If the thickness is less than 1 nm, the reflective layer 107 cannot be formed uniformly, hence both heat dissipating properties and optical effects of the reflective layer deteriorate. If the thickness is more than 80 nm, less light transmits the optical recording medium itself, hence a relation of light absorption adjustment (Ac/Aa>1) may not be realized.

Hereinafter, an intermediate layer 108, which mainly features the present invention, will be described.

The intermediate layer 108 plays two roles; one is to cool and dissipate the heat generated in the first recording layer structure 101, and the other is to suitably transmit a laser beam for recording and reproducing to the second recording layer structure 201.

The recording laser power of the present invention is preferably 3 mW to 12 mW. Since the laser for recording to the second recording layer structure 202 transmits primarily the first recording layer structure 101, a power of the laser is required to be stronger at the second recording layer structure 201 rather than at the first recording layer structure 101. Specifically, the power of the laser for the second recording layer 201 is 2% to 50% more than that for the first recording layer 101.

The optical recording medium of the present invention has two recording layer structures. As a particular problem for the optical recording medium having two recording layer structures, there is a need to take account of erasing power for rewriting. If the laser beam for erasing is irradiated both to the first recording layer structure 101 and the second recording layer structure 201 in the same power, the erasing power deteriorates in the second recording layer structure 201, since the erasing power is smaller than the recording power. To be more specific, the erasing power deteriorates when the laser beam for erasing transmits the first recording layer structure 101, and insufficient erasing power may be obtained in the second recording layer structure 201.

Taking account of the deterioration of erasing power when the laser beam for erasing transmits the first recording layer structure 101, the second recording layer structure 201 requires more erasing power than the first recording layer structure 101. Specific amount of the erasing power for the second recording layer structure 201 is 0.5 mW to 5 mW, which is 2% to 50% more than that for the first recording layer 101.

The optical recording medium having two recording layer structures of the present invention particularly needs to take account of heat dissipation properties. Because of the two recording layer structures (the first and the second recording layer structures), the optical recording medium of the present invention generates a lot larger heat value than an ordinary optical recording medium having only one recording layer structure. The two recording layer structures (including an intermediate layer and a separation layer) have less thermal capacity than the cover substrate 100 or the grooved substrate 200. Specifically, the two recording layer structures have 5% to 10% of thermal capacity, compared to that of the cover substrate 100 or the grooved substrate 200. Here, "thermal capacity" can be obtained by: heat conductivity X thickness. A thicker substrate is less likely to be affected by thermal stress of film-forming (sputtering), and to cause deformation of the substrate. Changing thermal capacity in each of the layers enables controlling the heat for recording. Accordingly, it enables controlling a recorded mark, and recording a small mark.

Materials for the cover substrate 100 and the grooved substrate 200 may be resins, glasses, or the like. Specific examples of the resins include polycarbonate (PC), polymethylmethacrylate (PMMA), and the like. Heat conductivity differs depending on the materials. The thermal capacity of the whole two recording layer structures depends on a volume of the materials. In the optical recording medium having two recording layer structures of the present invention, the cover substrate 100 and the grooved substrate 200 are each thicker than the whole two recording layer structures (including an intermediate layer and a separation layer), so that the two recording layer structures have less thermal capacity than the cover substrate 100 and the grooved substrate 200.

Specific examples of the materials for the cover substrate 100 and the grooved substrate 200 include a polycarbonate substrate having a thickness of, for example, 0.2 mm to 1.5 mm. The thickness of more than 1.5 mm does not affect the thermal capacity. Other materials may also be used, as long as it has a thickness of the above.

The optical recording process of the present invention includes the step of irradiating a laser beam from a direction of a cover substrate to one of two recording layer structures disposed on a grooved substrate of an optical recording medium according to the present invention, so as to record in one of the two recording layer structures. In the optical recording process, the laser beam has a recording power of 3 mW to 12 mW, wavelength of 360 nm to 420 nm and a spot diameter of 0.30 $\mu$m to 0.52 $\mu$m ($1/e^2$), the grooved substrate has a width of 0.10 $\mu$m to 0.46 $\mu$m and a depth of 0.01 $\mu$m to 0.04 $\mu$m, and is formed with a pitch of 0.28 $\mu$m to 0.50 $\mu$m, the two recording layer structures include a first recording layer structure and a second recording layer structure.

In the following Examples, an optical recording medium having a structure shown in FIG. 1, in which thicknesses of the first recording layer structure 101 and the intermediate layer 108 were changed, was manufactured, and then evaluated. Here, the intermediate layer 108 is formed of ITO comprising InO and SnO. The first recording layer structure 101 was formed with a thickness of 150 nm. The first recording layer structure 101 included a 30 nm thick recording layer 104 formed of Ge—Sb—Te (5:70:25; atomic ratio), 40 nm thick protective layers 102 and 106 formed of ZnS—$SiO_2$, a 40 nm thick reflective layer 107 formed of Ag. When the first recording layer structure 101 had thicknesses of 250 nm and 300 nm, each of the layers in the first recording layer structure 101 was also thickened proportionally. The second recording layer structure 201 had almost the same structure as that of the first recording layer structure 101, and each of the layers in the second recording layer structure 201 was also thickened proportionally. A 1 mm thick polycarbonate substrate was employed for both the cover substrate 101 and the grooved substrate 200. The separation layer 109 was formed of ultraviolet radiation cured resin with a thickness of 25 $\mu$m.

Recording conditions for the Examples are as shown below:

EXAMPLE 1

| | |
|---|---|
| Laser wavelength | 402 nm |
| Spotting diameter | 0.3 $\mu$m ($1/e^2$) |
| Recording power/erasing power | the first recording layer structure (7 mW/3 mW) the second recording layer structure (8.5 mW/3.5 mW) |
| Reproducing power | 0.6 mW |
| Modulation code | 1 to 7 modulation |
| Recording linear velocity | 16.5 m/s |
| Reproducing linear velocity | 5.7 m/s |
| Recording strategy | (n-1) types of multi-pulses (in a case of 3T, the multi-pulse is two), where "T" is an inverse number of a frequency of a standard clock |
| Head pulse width | 0.4 T |
| Multi-pulse width | 0.4 T |
| Off pulse width | 0.4 T |

EXAMPLE 2

| | |
|---|---|
| Laser wavelength | 410 nm |
| Spotting diameter | 0.52 $\mu$m ($1/e^2$) |
| Recording power/erasing power | the first recording layer structure (7.5 mW/3.5 mW) the second recording layer structure (9.5 mW/3.9 mW) |
| Reproducing power | 0.55 mW |
| Modulation code | 1 to 7 modulation |
| Recording linear velocity | 16.5 m/s |
| Reproducing linear velocity | 5.7 m/s |
| Recording strategy: | (n-1) types of multi-pulses (in a case of 3T, the multi-pulse is two), where "T" is an inverse number of a frequency of a standard clock |
| Head pulse width | 0.4 T |
| Multi-pulse width | 0.4 T |
| Off pulse width | 0.4 T |

The results of the evaluation are shown below. Table 1 shows the results of Example 1 and Table 2 shows the results of Example 2. Here, in a recording property, "◎," "○" and "X" are given in the tables based on an evaluation whether or not a sample may be used in practice. In an evaluation in a first recording layer, "◎" shows that jitter property was excellent and the jitter property was 8% or less. "○" shows that jitter property was less than 10%, recording and reproducing property was practical, and was in good condition. "X" shows that the jitter property deteriorated rapidly by accumulated heat (15% or more), and an error was unable to become recovered. In the evaluations for a second recording layer, "◎" shows that jitter property was excellent and the jitter property was 8% or less. "○" shows that jitter property was less than 10%, a recording and reproducing property was practical and is in good condition. "X" shows that the recording layer was not well amorphousized (which means that recording was not carried out), and reproducing property was impractical.

TABLE 1

| First recording layer structure thickness "T1" (nm) | Second recording layer structure thickness "T2" (nm) | Intermediate layer thickness "t" (nm) | Thickness-ratio "t/T1" | Recording property: First recording layer | Recording property: Second recording layer |
|---|---|---|---|---|---|
| 150 | 150 | 5 | 0.033 | X | ○ |
| 150 | 150 | 20 | 0.133 | X | ○ |
| 150 | 150 | 30 | 0.2 | ○ | ○ |
| 150 | 150 | 40 | 0.267 | ◎ | ◎ |
| 150 | 150 | 60 | 0.4 | ◎ | ◎ |
| 150 | 150 | 100 | 0.667 | ◎ | ◎ |
| 150 | 150 | 120 | 0.8 | ○ | ○ |
| 150 | 150 | 150 | 1 | ○ | ○ |
| 150 | 150 | 180 | 1.2 | ○ | X |
| 150 | 150 | 230 | 1.533 | ○ | X |
| 150 | 150 | 280 | 1.867 | ○ | X |
| 250 | 250 | 10 | 0.04 | X | ○ |
| 250 | 250 | 30 | 0.12 | X | ○ |
| 250 | 250 | 50 | 0.2 | ○ | ○ |
| 250 | 250 | 60 | 0.24 | ○ | ○ |
| 250 | 250 | 80 | 0.32 | ◎ | ◎ |
| 250 | 250 | 120 | 0.48 | ◎ | ◎ |
| 250 | 250 | 160 | 0.64 | ◎ | ◎ |
| 250 | 250 | 200 | 0.8 | ○ | ○ |
| 250 | 250 | 250 | 1 | ○ | ○ |
| 250 | 250 | 300 | 1.2 | ○ | X |
| 250 | 250 | 350 | 1.4 | ○ | X |
| 250 | 250 | 400 | 1.6 | ○ | X |
| 300 | 300 | 10 | 0.033 | X | ○ |
| 300 | 300 | 40 | 0.133 | X | ○ |
| 300 | 300 | 60 | 0.2 | ○ | ○ |
| 300 | 300 | 80 | 0.267 | ◎ | ◎ |
| 300 | 300 | 100 | 0.333 | ◎ | ◎ |
| 300 | 300 | 120 | 0.4 | ◎ | ◎ |
| 300 | 300 | 150 | 0.5 | ◎ | ◎ |
| 300 | 300 | 200 | 0.667 | ◎ | ◎ |
| 300 | 300 | 260 | 0.867 | ○ | ○ |
| 300 | 300 | 300 | 1 | ○ | ○ |
| 300 | 300 | 330 | 1.1 | ○ | X |
| 300 | 300 | 380 | 1.267 | ○ | X |
| 300 | 300 | 450 | 1.15 | ○ | X |

TABLE 2

| First recording layer structure thickness "T1" (nm) | Second recording layer structure thickness "T2" (nm) | Intermediate layer thickness "t" (nm) | Thickness-ratio "t/T1" | Recording property: First recording layer | Recording property: Second recording layer |
|---|---|---|---|---|---|
| 150 | 170 | 10 | 0.067 | X | ○ |
| 150 | 170 | 25 | 0.167 | X | ○ |
| 150 | 170 | 30 | 0.2 | ○ | ○ |
| 150 | 170 | 40 | 0.267 | ◎ | ◎ |
| 150 | 170 | 60 | 0.4 | ◎ | ◎ |
| 150 | 170 | 90 | 0.6 | ◎ | ◎ |
| 150 | 170 | 130 | 0.867 | ○ | ○ |
| 150 | 170 | 150 | 1 | ○ | ○ |
| 150 | 170 | 180 | 1.2 | ○ | X |
| 150 | 170 | 220 | 1.467 | ○ | X |
| 150 | 170 | 270 | 1.8 | ○ | X |
| 250 | 280 | 15 | 0.04 | X | ○ |
| 250 | 280 | 35 | 0.14 | X | ○ |
| 250 | 280 | 50 | 0.2 | ○ | ○ |
| 250 | 280 | 60 | 0.24 | ○ | ○ |
| 250 | 280 | 80 | 0.32 | ◎ | ◎ |
| 250 | 280 | 120 | 0.48 | ◎ | ◎ |
| 250 | 280 | 170 | 0.68 | ◎ | ◎ |
| 250 | 280 | 220 | 0.88 | ○ | ○ |
| 250 | 280 | 250 | 1 | ○ | ○ |
| 250 | 280 | 290 | 1.16 | ○ | X |
| 250 | 280 | 360 | 1.44 | ○ | X |
| 250 | 280 | 400 | 1.6 | ○ | X |

TABLE 2-continued

| First recording layer structure thickness "T1" (nm) | Second recording layer structure thickness "T2" (nm) | Intermediate layer thickness "t" (nm) | Thickness-ratio "t/T1" | Recording property First recording layer | Recording property Second recording layer |
|---|---|---|---|---|---|
| 300 | 350 | 20 | 0.067 | X | ○ |
| 300 | 350 | 45 | 0.15 | X | ○ |
| 300 | 350 | 60 | 0.2 | ○ | ○ |
| 300 | 350 | 80 | 0.267 | ◎ | ◎ |
| 300 | 350 | 100 | 0.333 | ◎ | ◎ |
| 300 | 350 | 120 | 0.4 | ◎ | ◎ |
| 300 | 350 | 150 | 0.5 | ◎ | ◎ |
| 300 | 350 | 200 | 0.667 | ◎ | ◎ |
| 300 | 350 | 260 | 0.867 | ○ | ○ |
| 300 | 350 | 300 | 1 | ○ | ○ |
| 300 | 350 | 340 | 1.133 | ○ | X |
| 300 | 350 | 380 | 1.267 | ○ | X |
| 300 | 350 | 460 | 1.153 | ○ | X |

In the following Examples, an optical recording medium having a structure shown in FIG. 2 will be described. Here, the first recording layer 101 was formed with a thickness of 200 nm. The first recording layer structure 101 included a 20 nm thick recording layer 104 formed of Ge—Sb—Te (5:70:25; atomic ratio), 40 nm thick protective layers 102 and 106 formed of ZnS—$SiO_2$, 30 nm thick interface layer 103 and 105, and a 40 nm thick reflective layer 107 formed of Ag. When the first recording layer structure 101 had thicknesses of 300 nm and 400 nm, each of the layers in the first recording layer structure was also thickened proportionally. The second recording layer structure 201 had almost the same structure as that of the first recording layer structure 101; and each of the layers in the second recording layer structure 201 was also thickened accordingly. A 1 mm thick polycarbonate substrate was employed for both the cover substrate 101 and the grooved substrate 200. The separation layer 109 was formed of ultraviolet radiation cured resin with a thickness of 30 $\mu$m.

Recording conditions for the Examples are as shown below:

EXAMPLE 3

| | |
|---|---|
| Laser wavelength | 402 nm |
| Spotting diameter | 0.3 $\mu$m (1/$e^2$) |
| Recording power/erasing power | the first recording layer structure (7 mW/3 mW) the second recording layer structure (9 mW/3.3 mW) |
| Reproducing power | 0.6 mW |
| Modulation code | 1 to 7 modulation |
| Recording linear velocity | 16.5 m/s |
| Reproducing linear velocity | 5.7 m/s |
| Recording strategy | (n-1) types of multi-pulses (in a case of 3T, the multi-pulse is two), where "T" is an inverse number of a frequency of a standard clock |
| Head pulse width | 0.4 T |
| Multi-pulse width | 0.4 T |
| OFF pulse width | 0.4 T |

EXAMPLE 4

| | |
|---|---|
| Laser wavelength | 410 nm |
| Spotting diameter | 0.52 $\mu$m (1/$e^2$) |
| Recording power/erasing power | the first recording layer structure (8 mW/3.5 mW) the second recording layer structure (10 mW/3.7 mW) |
| Reproducing power | 0.55 mW |
| Modulation code | 1 to 7 modulation |
| Recording linear velocity | 16.5 m/s |
| Reproducing linear velocity | 5.7 m/s |
| Recording strategy | (n-1) types of multi-pulses (in a case of 3T, the multi-pulse is two), where "T" is an inverse number of a frequency of a standard clock |
| Head pulse width | 0.4 T |
| Multi-pulse width | 0.4 T |
| OFF pulse width | 0.4 T |

The results of the evaluation are shown below. Table 3 shows the results of Example 3 and Table 4 shows the results of Example 4. Here, in a recording property, "◎," "○" and "X" are given in the tables based on an evaluation whether or not a sample may be used in practice. In an evaluation in a first recording layer, "◎" shows that jitter property was excellent and the jitter property was 8% or less, "○" shows that jitter property was less than 10%, recording and reproducing property was practical, and was in good condition. "X" shows that the jitter property deteriorated rapidly by accumulated heat (15% or more), and an error was unable to become recovered. In the evaluations for a second recording layer, "○" shows that jitter property was less than 10%, a recording and reproducing property was practical and was in good condition. "X" shows that the recording layer was not well amorphousized (which means that recording was not carried out), and reproducing property was impractical.

TABLE 3

| First recording layer structure thickness "T1" (nm) | Second recording layer structure thickness "T2" (nm) | Intermediate layer thickness "t" (nm) | Thickness-ratio "t/T1" | Recording property: First recording layer | Recording property: Second recording layer |
|---|---|---|---|---|---|
| 200 | 200 | 5 | 0.025 | X | ○ |
| 200 | 200 | 20 | 0.1 | X | ○ |
| 200 | 200 | 30 | 0.15 | X | ○ |
| 200 | 200 | 40 | 0.2 | ○ | ○ |
| 200 | 200 | 60 | 0.3 | ○ | ○ |
| 200 | 200 | 100 | 0.5 | ◎ | ◎ |
| 200 | 200 | 140 | 0.7 | ◎ | ◎ |
| 200 | 200 | 180 | 0.9 | ○ | ○ |
| 200 | 200 | 200 | 1 | ○ | ○ |
| 200 | 200 | 220 | 1.1 | ○ | X |
| 200 | 200 | 240 | 1.2 | ○ | X |
| 200 | 200 | 300 | 1.5 | ○ | X |
| 300 | 300 | 10 | 0.033 | X | ○ |
| 300 | 300 | 30 | 0.1 | X | ○ |
| 300 | 300 | 50 | 0.167 | X | ○ |
| 300 | 300 | 60 | 0.2 | ○ | ○ |
| 300 | 300 | 80 | 0.267 | ○ | ○ |
| 300 | 300 | 120 | 0.4 | ○ | ○ |
| 300 | 300 | 160 | 0.533 | ◎ | ◎ |
| 300 | 300 | 210 | 0.7 | ◎ | ◎ |
| 300 | 300 | 270 | 0.9 | ○ | ○ |
| 300 | 300 | 300 | 1 | ○ | ○ |
| 300 | 300 | 320 | 1.067 | ○ | X |
| 300 | 300 | 350 | 1.167 | ○ | X |
| 300 | 300 | 400 | 1.333 | ○ | X |
| 400 | 400 | 10 | 0.025 | X | ○ |
| 400 | 400 | 40 | 0.1 | X | ○ |
| 400 | 400 | 60 | 0.15 | X | ○ |
| 400 | 400 | 80 | 0.2 | ○ | ○ |
| 400 | 400 | 100 | 0.25 | ○ | ○ |
| 400 | 400 | 110 | 0.275 | ○ | ○ |
| 400 | 400 | 150 | 0.375 | ○ | ○ |
| 400 | 400 | 200 | 0.5 | ◎ | ◎ |
| 400 | 400 | 280 | 0.7 | ◎ | ◎ |
| 400 | 400 | 360 | 0.9 | ○ | ○ |
| 400 | 400 | 400 | 1 | ○ | ○ |
| 400 | 400 | 430 | 1.075 | ○ | X |
| 400 | 400 | 460 | 1.15 | ○ | X |
| 400 | 400 | 600 | 1.5 | ○ | X |

TABLE 4

| First recording layer structure thickness "T1" (nm) | Second recording layer structure thickness "T2" (nm) | Intermediate layer thickness "t" (nm) | Thickness-ratio "t/T1" | Recording property: First recording layer | Recording property: Second recording layer |
|---|---|---|---|---|---|
| 200 | 250 | 10 | 0.005 | X | ○ |
| 200 | 250 | 25 | 0.125 | X | ○ |
| 200 | 250 | 35 | 0.175 | X | ○ |
| 200 | 250 | 40 | 0.2 | ○ | ○ |
| 200 | 250 | 50 | 0.25 | ○ | ○ |
| 200 | 250 | 100 | 0.5 | ◎ | ◎ |
| 200 | 250 | 140 | 0.7 | ◎ | ◎ |
| 200 | 250 | 180 | 0.9 | ○ | ○ |
| 200 | 250 | 200 | 1 | ○ | ○ |
| 200 | 250 | 220 | 1.1 | ○ | X |
| 200 | 250 | 250 | 1.25 | ○ | X |
| 200 | 250 | 280 | 1.4 | ○ | X |
| 300 | 350 | 10 | 0.033 | X | ○ |
| 300 | 350 | 25 | 0.083 | X | ○ |
| 300 | 350 | 40 | 0.133 | X | ○ |
| 300 | 350 | 60 | 0.2 | ○ | ○ |
| 300 | 350 | 100 | 0.333 | ○ | ○ |
| 300 | 350 | 150 | 0.5 | ◎ | ◎ |
| 300 | 350 | 200 | 0.667 | ◎ | ◎ |
| 300 | 350 | 250 | 0.833 | ○ | ○ |

TABLE 4-continued

| First recording layer structure thickness "T1" (nm) | Second recording layer structure thickness "T2" (nm) | Intermediate layer thickness "t" (nm) | Thickness-ratio "t/T1" | Recording property: First recording layer | Recording property: Second recording layer |
|---|---|---|---|---|---|
| 300 | 350 | 300 | 1 | ○ | ○ |
| 300 | 350 | 300 | 1 | ○ | ○ |
| 300 | 350 | 330 | 1.1 | ○ | X |
| 300 | 350 | 380 | 1.267 | ○ | X |
| 300 | 350 | 450 | 1.5 | ○ | X |
| 400 | 450 | 10 | 0.025 | X | ○ |
| 400 | 450 | 25 | 0.063 | X | ○ |
| 400 | 450 | 60 | 0.15 | X | ○ |
| 400 | 450 | 80 | 0.2 | ○ | ○ |
| 400 | 450 | 110 | 0.275 | ○ | ○ |
| 400 | 450 | 150 | 0.375 | ○ | ○ |
| 400 | 450 | 200 | 0.5 | ◎ | ◎ |
| 400 | 450 | 300 | 0.75 | ◎ | ◎ |
| 400 | 450 | 400 | 1 | ○ | ○ |
| 400 | 450 | 440 | 1.1 | ○ | X |
| 400 | 450 | 500 | 1.25 | ○ | X |
| 400 | 450 | 600 | 1.5 | ○ | X |

As shown in the results of the Examples, a ratio of a thickness of the first recording layer structure and a thickness of the intermediate layer is preferably 0.2 to 1.0. With the ratio, the heat generated from the first recording layer structure is suitably dissipated, without heat accumulation. The ratio is more preferably 0.3 to 0.8, and still more preferably 0.5 to 0.7.

The structures of the present invention, the second recording layer structure has more recording power and erasing power than the first recording layer structure. With the more recording power and erasing power, each of the first and second recording layer structures exhibits uniform recording properties and high erasing and reproducing properties.

The first and second recording layer structures have less thermal capacity than the cover substrate and the grooved substrate. Therefore, heat load to the optical recording medium itself may be reduced.

Having two recording layer structures, the optical recording medium of the present invention enables reducing the heat load to the optical recording medium, and improving repetitive recording properties. As a result, the optical recording medium of the present invention enables twice more recording capacity than a conventional optical recording medium.

Materials for the intermediate layer 108 can be other materials than those provided in the Examples. Specific examples of the materials include Al—N, Al—O—N, Al—C, Si, Si—N, $SiO_2$, Si—O—N, Si—C, Ti—N, $TiO_2$, Ti—C, Ta—N, $Ta_2O_5$, Ta—O—N, Ta—C, Zn—O, ZnS, ZnSe, Zr—N, Zr—O—N, Zr—C, W—C, $InO_2$—$SnO_2$, $ZrO_2$—$Y_2O_3$, $InO_2$—$ZrO_2$, $Al_2O_3$—$ZrO_2$, and the like. These can be used in combination. A mixture of these with metal or metalloid, or an alloy of these can also be used. Of these, except for the materials provided in the Examples, $InO_2$—$SnO_2$ or $InO_2$—$ZrO_2$ can exhibit excellent heat dissipation properties.

The separation layer 109 is formed for the purpose of optically or thermally separating the first recording layer structure 101 from the second recording layer structure 201. The separation layer 109 may be formed of materials that exhibits as little light absorption as possible against the laser beam for recording and reproducing. Examples of the materials include resins formed of organic materials such as an ultraviolet radiation cured resin, a slow-acting resin, or the like; a double-sided adhesion sheet for an optical disk, inorganic dielectrics such as $SiO_2$, $Al_2O_3$, ZnS, or the like; glasses, and the like.

A thickness of the separation layer 109 is required to be a thickness having depth of focus of ΔZ or more, so that a crosstalk from a direction of one of the first and the second recording layer structures can be ignored, when recording and reproducing is carried out in one of the first and second recording layer structures. ΔZ can be approximately obtained by the following equation, when a standard for ΔZ is 80% of strength of the condensing point.

$$\Delta Z=\lambda/\{2\times(NA)^2\}$$

wherein, "NA" expresses a numerical aperture of an objective lens, and "λ" expresses wavelength of a laser beam for recording and reproducing. For example, a depth of focus, ΔZ, is 0.56 μm when "λ" is 400 nm, and "NA" is 0.60. In this case, a range of ±0.60 μm lies in the depth of focus. Therefore, a thickness of the separation layer 109 needs to be more than 1.20 μm.

A thickness of the separation layer 109 may be within a tolerance of the objective lens, so that a distance between the first and the second recording layer structures is within a range that the objective lens are able to condense the laser beam. Recording and reproducing at the second recording layer structure 201 may be carried out by transmitting the laser beam through the first recording layer structure 101. A reflection rate, "r2," can be obtained by the following equation, when the light-transmittance of a laser beam in the first recording layer structure 101 is "T1," the reflection rate of the laser bean in the first recording layer structure 101 is "R1," the reflection rate only in the second recording layer structure 201 is "R2."

$$r2=R2\times T1\times T1$$

The signal amplitude can also be obtained by the following equation, when the reflection rate difference within the second recording layer structure 201 is ΔR2, the reflection rate difference of the laser beam when transmitting the first recording layer structure 101 through the second recording layer structure 202 is Δr2.

$$\Delta r2 = \Delta R2 \times T1 \times T1$$

For example, Δr2, the reflection rate difference of the laser beam when transmitting the first recording layer structure 101 through the second recording layer structure 202, is, 24%×0.5×0.5=6%, when ΔR2 is 24%, and T1 is 50%.

In order to obtain a sufficient signal from the second recording layer structure 201, the first recording layer structure 101 requires to have as high light transmittance T1 as possible, and the second recording layer structure 201 requires to have as large signal amplitude as possible. The reflection rate difference in the first recording layer 101 needs to be preferably high, and the recording sensitivity in the second recording layer structure also needs to be considerably high. The first recording layer structure 101 and the second recording layer structure 201 need to be structured optically, so as to balance the light-transmittance, the signal amplitude, the reflection rate difference, and the recording sensitivity.

A specific example of the structure of the optical recording medium is provided. Here, the optical recording medium is structured, so as to have a reflection rate R1c of 7.5% when the recording layer 104 is in a crystalline state, a reflection rate R1a of 0.5% when the recording layer 104 is in an amorphous state, a reflection rate R2c of 15% when the recording layer 204 is in a crystalline state, the reflection rate R2a of 43% when the recording layer 204 is in an amorphous state, and the light transmittance of the first recording layer structure 101 of 50% when recording is carried out only in the first recording layer structure 101. The reflection rate, light transmittance, and other optical structural values were controlled by changing the thicknesses of the recoding layer 104, the protective layers 102, 106, and the reflective layer 107.

When the optical recording medium has a structure as the above, the reflection rate difference is, Δr2=(43−15)×0.5×0.5=7%, in which the recording and reproducing is carried out in the second recording layer 201 through the first recording layer 101. The reflection rate difference at the first recording layer structure 101 is 7.5−0.5=7%. A preferable structure of the optical recording medium has almost the same value of the reflection rate difference, namely a signal amplitude, between the first recording layer structure 101 and the second layer structure 201. With the preferable structure, the signal amplitude radically becomes changed when recording and reproducing is carried out interchangeably between the first recording layer structure 101 and the second recording layer structure 201. Therefore, the optical recording medium having the preferable structure can prevent instable tracking.

It is very difficult to have the high light transmittance in the first recording layer structure 101 and the high reflection rate difference in the second recording layer 201 at the same time. Therefore, the reflection rate difference is relatively small, and the signal amplitude is also relatively small, after the optical recording medium is structured. In this case, the power level P3 of the recording laser beam may be preferably a bit larger than that of the conventional optical recording medium, and the signal amplitude for reproducing may preferably be large. However, if the P3 has an exceedingly large value, the recorded mark is thermally affected, hence the reproducing signal deteriorates. The P3 therefore needs to be within the range that does not cause deterioration of the reproducing signal. The reproducing power level may be different between the first recording layer structure 101 and the second recording layer structure 201. The laser beam for reproducing may also be different between the first recording layer structure 101 and the second recording layer structure 201, although the laser beam having the same wavelength is ordinarily irradiated.

Figure 3:
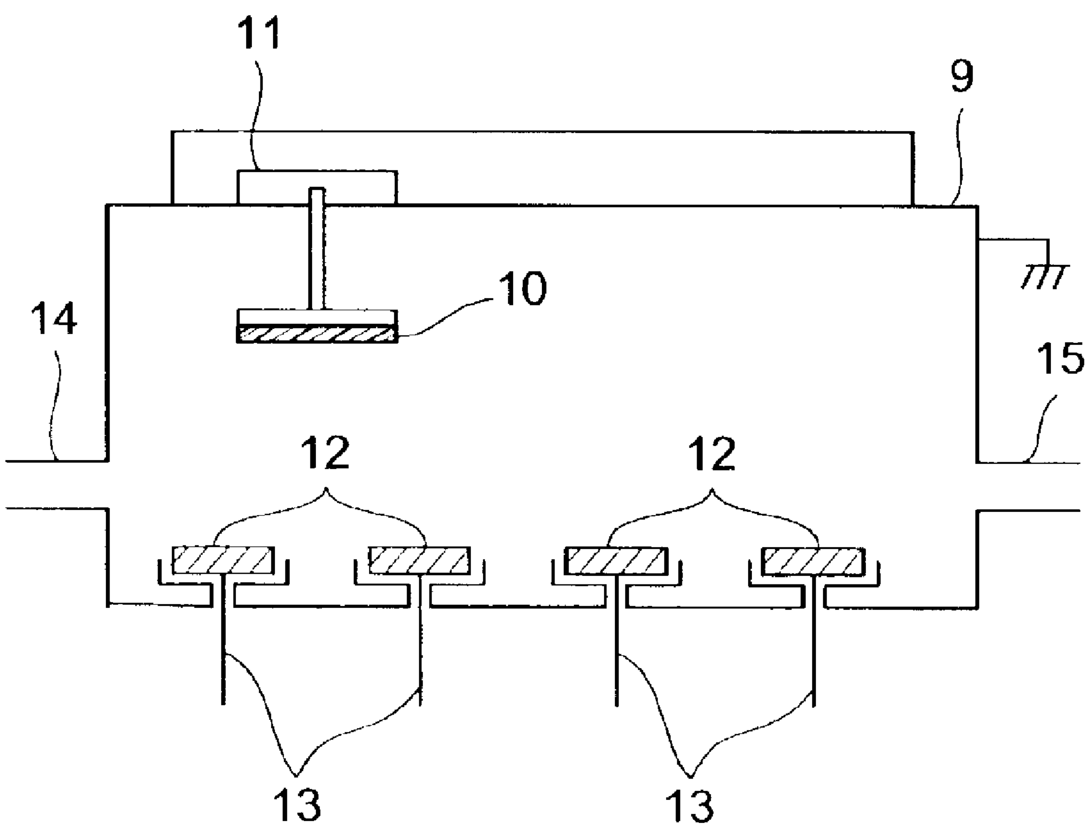
FIG. 3 is a schematic diagram showing an example of a film deposition system used for manufacturing a light-transmittance optical recording medium having two recording layer structures according to the present invention.
Figure 4:
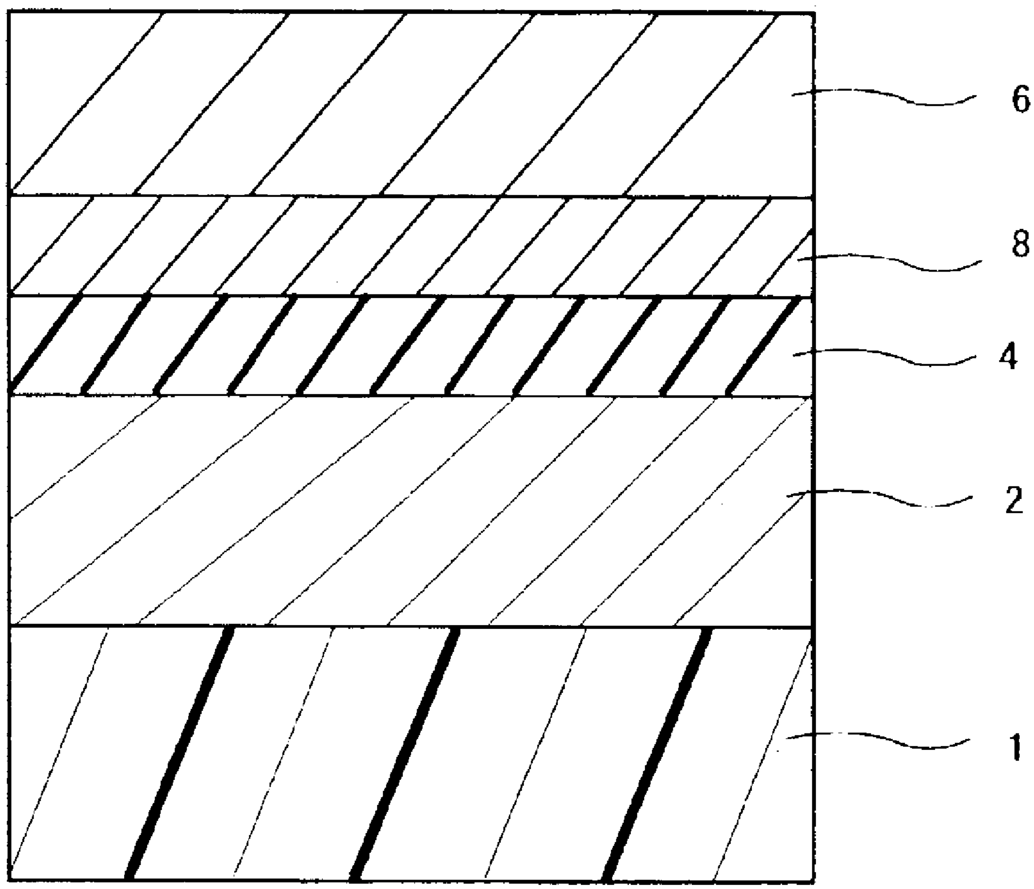
FIG. 4 is a sectional view showing an example of a layer structure of a conventional phase change optical recording medium.

A process for manufacturing the optical recording medium will be described hereinafter. Multi layers can be formed by sputtering method, vacuum deposition, CVD method, or the like. Here, the process employs the sputtering method. FIG. 3 is a schematic diagram showing an example of a film-forming device.

Referring into FIG. 3, the vacuum container 9 is equipped with the exhaust port 15 which is connected with a vacuum pump (not shown in FIG. 3), so as to maintain inside the vacuum container 9 highly vacuum. The gas supply port 14 is also provided in the vacuum container 9, so as to supply rare gas, nitrogen, oxide, or a mixture thereof, in a certain flow. The vacuum container 9 also includes a substrate 10, which is attached to the drive unit 11 that rotates and revolves the substrate 10. The sputter targets 12, which face the substrate 10, are each connected to negative electrodes 13. The negative electrodes 13 are each connected to either direct-current power (not shown in FIG. 3), or high-frequency power (not shown in FIG. 3), through a switch (not shown in FIG. 3). Since grounded, the vacuumed container 9 and the substrate 10 are maintained in positive electrode.

The film-forming gas may be rare gas, a mixture gas in which rare gas and a small amount of nitrogen or oxygen is mixed. Examples of the rare gas include Ar, Kr, and the like, each of which enables film-forming. Using the mixture gas in which rare gas and a small amount of nitrogen or oxygen is mixed for forming the layers of an optical recording medium, the recording layers 104 and 204 and the protective layers 102, 106, 202, and 206 enable controlling substance transport during repetitive recording, hence enables improving repetitive properties.

When nitride or oxide is contained in the interface layers 103, 105, 203, and 205, or the intermediate layer 108, the reactive sputtering method enables forming an excellent layer. For example, when Ge—Cr—N is used in the interface layers 103, 105, 203, and 205, a mixture gas of rare gas and nitrogen gas is used as a film-forming gas to a target of the material including Ge, Cr, and 0. Alternatively, gas including nitrogen atoms such as $N_2O$, $NO_2$, NO, $N_2$ or the like, can also be used. The combination of the nitrogen atoms with the rare gas, which is mixture gas, can also be used. When the layer is hard or has a large membrane stress, a very small amount of oxygen can be mixed into the film-forming gas, so as to realize a layer with an excellent film.

A recording and reproducing process and an erasing process with the optical recording medium structured above will be described hereinafter. The recording and reproducing process and the erasing process require an optical head which has a laser beam source and objective lens, a drive unit which determines a portion to irradiate the laser beam, a tracking controlling device and a focus controlling device which control a position of a vertical direction to tracking and to a surface of a layer, a laser beam drive unit which modulates a laser power, and a rotation controlling device which rotates the optical recording medium.

Recording and erasing are carried out as follows. First, an optical recording medium is rotated by the rotation controlling device. Thereafter, a laser beam is focused onto a small spot so as to irradiate the laser beam to the optical medium. The recorded mark or the erased portion is formed by modulating the laser power between P1 and P2, where P1 refers to a power level to generate an amorphous state in which a portion in a recording layer is reversibly changed to an amorphous state from a crystalline state by irradiating the laser beam, and P2 refers to a power level to generate a crystalline state in which the amorphous state is reversibly changed to a crystalline state from the amorphous state also by irradiating the laser beam. In this way, recording, erasing, and overwriting are carried out. A portion to be irradiated with a laser beam having P1 is ordinarily formed by column of pulse, which is usually referred to as "multi pulse."

A reproducing power level, P3, which is smaller than each of P1 and P2, does not affect an optical state of the recorded mark, and contributes to obtaining sufficient reflection rate to reproduce the recorded mark by irradiating a laser beam having P3, also enables reproducing the signal by reading a signal by a detector from the optical recording medium.

The optical recording medium of the present invention may have another layer in addition to those described as a layer structure.

According to the present invention, the optical recording medium having the two recording layer structures exhibits an excellent recording and reproducing properties in each of the first recording layer structure and the second recording layer structure, as a thickness of one of the recording layer structures to which a laser beam is firstly irradiated, and a thickness of the intermediate layer are optimized. Therefore, the optical recording medium having two recording layer structures of the present invention enables twice more recording capacity than an ordinary optical recoding medium having one recording layer structure. With the optimization, heat load to the optical recording medium can be reduced, hence repetitive recording properties can also be improved. Providing interface layers on surfaces of the recording layer prevents the recording layer from oxidizing, corroding, deforming, or the like. The diffusion of atoms between the recording layer and a protective layer can also be prevented. Accordingly, the optical recording medium of the present invention can have excellent repetitive properties. Furthermore, the optical recording medium enables erasing at a high speed, as the interface layers accelerate amorphousization of the optical recording medium without deteriorating thermal stability.

What is claimed is:

1. An optical recording medium comprising:

a cover substrate;

a first recording layer structure;

an intermediate layer;

a separation layer;

a second recording layer structure; and a grooved substrate, wherein the cover substrate, the first recording layer structure, the intermediate layer, the separation layer, the second recording layer structure and the grooved substrate are disposed in this order, a laser beam is irradiated from a direction of the cover substrate, the first recording layer structure includes, in this order, a first protective layer, a first recording layer which comprises Sb and Te as main components thereof, a second protective layer, a first inorganic layer which comprises metal as components thereof, the second recording layer structure includes, in this order, a third protective layer, a second recording layer which comprises Sb and Te as main components thereof, a fourth protective layer, a second inorganic layer which comprises metal as a component thereof, and a ratio (t/T1) of a thickness (T1) of the first recording layer structure and a thickness (t) of the intermediate layer is 0.2 to 1.0.

2. An optical recording medium according to claim 1, wherein an interface layer is formed on at least one of surfaces of at least one of the first recording layer and the second recording layer.

3. An optical recording medium according to claim 1, wherein the grooved substrate with a width of 0.10 μm to 0.46 μm and a depth of 0.01 μm to 0.04 μm, and is formed with a pitch of 0.28 μm to 0.50 μm, recording and reproducing are carried out by irradiating a laser beam having wavelength of 360 nm to 420 nm and a spot diameter of 0.30 μm to 0.52 μm ($1/e^2$) from a direction of the cover substrate, and a recording power of the laser beam is 3 mW to 12 mW.

4. An optical recording medium according to claim 1, wherein the recording power of the laser beam is larger in the second recording layer structure than in the first recording layer structure.

5. An optical recording medium according to claim 1, wherein an erasing power of the laser beam is larger in the second recording layer than in the first recording layer.

6. An optical recording medium according to claim 1, wherein a thermal capacity of the second recording layer structure is less than a total thermal capacity of the cover substrate and the grooved substrate.

7. An optical recording medium according to claim 1, wherein a total thermal capacity of the first recording layer structure and the second recording layer structure is less than a thermal capacity of the grooved substrate.

8. An optical recording medium according to claim 1, wherein a thickness of each of the cover substrate and the grooved substrate is 0.2 mm to 1.5 mm.

9. An optical recording medium according to claim 1, wherein the main components of each of the first recording layer and the second recording layer are selected at least from Ge—Sb—Te, Sb—Te, Sb—Te—Zn, Sb—Te—Ag, Te—Bi—Ge, Sb—Te—Ge—Se, Te—Sn—Ge—Au, Sb—Te—Ag—In, Se—In—Sb, and Te—Se—In.

10. An optical recording medium according to claim 1, wherein each of the first recording layer and the second recording layer comprises 50 at % to 80 at % of the Sb, and 10 at % to 30 at % of the Te.

11. An optical recording medium according to claim 1, wherein a thickness of the first recording layer is 3 nm to 40 nm.

12. An optical recording medium according to claim 1, wherein a thickness of the second recording layer is 3 nm to 40 nm.

13. An optical recording medium according to claim 1, wherein a thickness of the first inorganic layer is 1 nm to 80 nm.

14. An optical recording medium according to claim 1, wherein a thickness of the second inorganic layer is 1 nm to 80 nm.

15. An optical recording medium according to claim 1, wherein the components are one of the same and different between the first recording layer structure and the second layer structure, and the components are selected at least from Al, Au, Ag, and Cu.

16. An optical recording medium according to claim 15, wherein the first inorganic layer comprises Ag as a main component thereof.

17. An optical recording medium according to claim 1, wherein each of the first protective layer, the second protective layer, the third protective layer, and the fourth protective layer comprises $ZnS—SiO_2$ as a main component thereof.

18. An optical recording process comprising the step of:

irradiating a laser beam from a direction of a cover substrate to one of two recording layer structures disposed on a grooved substrate of an optical recording medium, so as to record in one of the two recording layer structures, wherein the laser beam has a recording power of 3 mW to 12 mW, wavelength of 360 nm to 420 nm and a spot diameter of 0.30 μm to 0.52 μm ($1/e^2$), the grooved substrate has a width of 0.10 μm to 0.46 μm and a depth of 0.01 μm to 0.04 μm, and is formed with a pitch of 0.28 μm to 0.50 μm, the two recording layer structures include a first recording layer structure and a second recording layer structure, and the optical recording medium comprises:

the cover substrate;

the first recording layer structure;

an intermediate layer;

a separation layer;

the second recording layer structure; and the grooved substrate, wherein the cover substrate, the first recording layer structure, the intermediate layer, the separation layer, the second recording layer structure and the grooved substrate are disposed in this order, the first recording layer structure includes, in this order, a first protective layer, a first recording layer which comprises Sb and Te as main components thereof, a second protective layer, a first inorganic layer which comprises metal as components thereof, the second recording layer structure includes, in this order, a third protective layer, a second recording layer which comprises Sb and Te as main components thereof, a fourth protective layer, a second inorganic layer which comprises metal as a component thereof, a ratio (t/T1) of a thickness (T1) of the first recording layer structure and a thickness (t) of the intermediate layer is 0.2 to 1.0.

19. An optical recording process according to claim 18, wherein the recording power of the laser beam is larger in the second recording layer structure than in the first recording layer structure.

20. An optical recording process according to claim 18, wherein an erasing power of the laser beam is larger in the second recording layer than in the first recording layer.

* * * * *